(12) United States Patent
Goldsmith et al.

(10) Patent No.: US 7,854,846 B2
(45) Date of Patent: Dec. 21, 2010

(54) MEMBRANE DEVICES WITH CONTROLLED TRANSMEMBRANE PRESSURE AND METHOD OF USE

(75) Inventors: Robert L. Goldsmith, Wayland, MA (US); Bruce A. Bishop, Arlington, MA (US)

(73) Assignee: Ceramem Corporation, Plainfield, IL (US)

( * ) Notice: Subject to any disclaimer, the term of this patent is extended or adjusted under 35 U.S.C. 154(b) by 475 days.

(21) Appl. No.: 11/758,200

(22) Filed: Jun. 5, 2007

(65) Prior Publication Data

US 2007/0241055 A1 Oct. 18, 2007

Related U.S. Application Data

(63) Continuation of application No. 10/676,671, filed on Oct. 1, 2003, now Pat. No. 7,276,163.

(51) Int. Cl.
*B01D 71/02* (2006.01)
*B01D 69/10* (2006.01)
*B01D 61/14* (2006.01)
*B01D 61/36* (2006.01)
*B01D 61/00* (2006.01)

(52) U.S. Cl. ............... 210/650; 210/510.1; 210/500.21; 210/500.25

(58) Field of Classification Search ................ None
See application file for complete search history.

(56) References Cited

U.S. PATENT DOCUMENTS 4,781,831 A * 11/1988 Goldsmith ................ 210/247

4,906,362 A * 3/1990 Holm et al. ................ 210/196
5,906,739 A * 5/1999 Osterland et al. ...... 210/321.81
6,077,436 A * 6/2000 Rajnik et al. ................ 210/650

FOREIGN PATENT DOCUMENTS

| EP | 1090671 | 4/2001 |
|---|---|---|
| JP | 1501534 | 6/1989 |
| JP | 2500728 | 3/1990 |
| JP | 02068121 | 7/1990 |
| JP | 2001259326 | 3/2000 |
| JP | 2000153117 | 6/2000 |
| JP | 2002143655 | 5/2002 |
| JP | 2002537104 | 11/2002 |
| WO | 0139857 | 6/2001 |

* cited by examiner

*Primary Examiner*—Krishnan S Menon
(74) *Attorney, Agent, or Firm*—Coats & Bennett, P.L.L.C.

(57) ABSTRACT

A crossflow membrane device that receives a feedstock at a feed end face and separates the feedstock into permeate and retentate. The device has a membrane support containing at least one monolith of porous material defining a plurality of passageways extending longitudinally from the feed end face of the monolith to a retentate end face of the monolith through which the feedstock flows to pass retentate from the device. A permselective membrane coating of finer pore size than that of the porous material is applied to the passageway wall surfaces of the monolith. At least one permeate conduit is formed within the monolith, the conduit containing a plurality of longitudinal permeate chambers communicating with a means of permeate introduction at or near the feed end face and permeate withdrawal at or near the retentate end face. The permeate is separated from feed and retentate, and a portion of the permeate is circulated through the permeate conduit to create a decreasing permeate pressure within the permeate conduit from the feed end of the membrane device to the retentate end of the device to control transmembrane pressure along the length of the device.

32 Claims, 3 Drawing Sheets

Figure 3a.
Figure 3b.
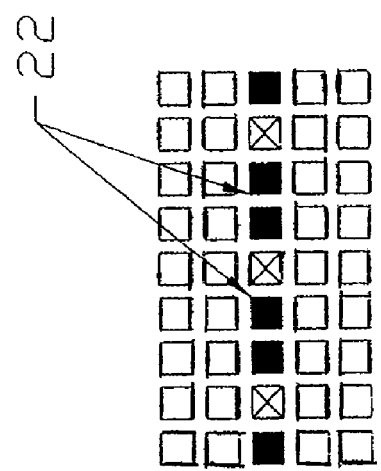
Figure 4.

MEMBRANE DEVICES WITH CONTROLLED TRANSMEMBRANE PRESSURE AND METHOD OF USE

CROSS-REFERENCE TO RELATED APPLICATION

This application is a continuation of application Ser. No. 10/676,671 filed on Oct. 1, 2003 now U.S. Pat. No. 7,276,163. Priority is claimed.

FIELD OF THE INVENTION

This invention relates to an improved crossflow membrane device that receives a feedstock at a feed end face and separates the feedstock into permeate and retentate. The device has a membrane support containing at least one monolith of porous material defining a plurality of passageways extending longitudinally from the feed end face of the monolith to a retentate end face of the monolith. At least one permeate conduit is formed within the monolith, the conduit containing a plurality of longitudinal permeate chambers communicating with a means of permeate introduction at or near the feed end face and permeate withdrawal at or near the retentate end face. The permeate is separated from feed and retentate, and a portion of the permeate is circulated through the permeate conduit co-currently with feedstock flow to control transmembrane pressure along the length of the device.

BACKGROUND OF THE INVENTION

For crossflow microfiltration and ultrafiltration, it is generally recognized that maintaining a uniform transmembrane pressure along the length of a membrane module is advantageous. For such membrane modules a feedstock is circulated from a feed end of the module to a retentate end of the module. A relatively high crossflow velocity is desired to minimize concentration polarization of feed constituents retained at the membrane surface so as to be able to maintain a high and relatively stable membrane flux over time. This high crossflow velocity also results in a pressure drop from the feed end of the module to the retentate end. This pressure drop can be as high as 2 to over 4 bar for membrane modules, depending on the crossflow velocity, fluid viscosity, and membrane feed channel hydraulic diameter and length. For microfiltration, in particular, it can be desirable to operate at a transmembrane pressure (TMP) of less than 1 bar. This is desirable first, for maintaining a relatively stable flux by minimizing concentration polarization and accompanying membrane fouling. Second, operation at low TMP can minimize membrane pore plugging. Third, for some applications, the polarization layer (intensified at high TMP) can become a dynamic membrane and retain feed species that are desired to be removed in a permeate stream. For a feed to retentate pressure decrease from, for example, 5 bar to 2 bar along a membrane module, and a permeate pressure level of 1 bar, the TMP would decrease from 4 bar at the module inlet to 1 bar at the retentate outlet. It is preferred to operate a membrane module at a constant TMP, e.g., 1 bar, and this is the object of the present invention for specific membrane configurations.

One means of equalizing the TMP from a feed end of a membrane module to the retentate end is to circulate permeate in co-current flow along the exterior of a membrane element or elements contained in a permeate collection housing. The pressure drop for the flowing permeate can be controlled to match the feed to retentate pressure drop, thereby resulting in a controllable and essentially constant TMP along the length of the membrane elements. This means was disclosed in 1978 by Sandblom, in U.S. Pat. No. 4,105,547, assigned to Alfa-Laval AB. A subsequent patent also assigned to Alfa-Laval (Holm, et al. in U.S. Pat. No. 4,906,362) further included the addition of a granular filler to the permeate space around a multiplicity of membrane elements in a housing. This filler served to create an increased resistance in the permeate cavity for permeate flow. This reduced the required permeate flow rate to achieve nearly constant TMP in the module, simplifying a system by reducing permeate circulation flow and resulting equipment size and cost, and also reducing power consumption.

An alternative to filling the permeate cavity in a multielement membrane module to reduce the required permeate circulation flow has been patented by Osterland, et al. in U.S. Pat. No. 5,906,739. In this patent, means are disclosed to encase individual membrane elements within individual permeate collection tubes, creating a small annular space between the membrane element and the permeate tube. The permeate flow through such annuli required to create the desired pressure drop in the co-current permeate flow is reduced from that that would be present in a membrane device with a multiplicity of membrane elements contained only in a housing without the flow restriction disclosed by Holm.

In general, the above techniques are applicable to membrane elements in both tubular and multi-channel configuration. However, the latter are preferred for cost reasons. For these multi-channel membrane devices, two other means for control of TMP along the length of the elements have been commercialized. First is the grading of the permeability of the membrane support along its length, as disclosed by Garcera and Toujas in U.S. Pat. No. 6,375,014. In this technique, the resistance of the membrane support is greater at the feed inlet than it is at the retentate outlet. Within a range of membrane flux, the flow resistance of the support provides a higher pressure drop for permeate flow to the permeate collection zone at the inlet of the element than at the outlet. A second technique has been commercialized by TAMI Industries, and this consists of varying the membrane thickness and resistance along the length of a membrane element. A thicker membrane at the inlet provides a higher pressure drop for permeate flow at the element inlet than at the element outlet, thereby providing a more uniform TMP along the length of the membrane element (Grangeon, et al., U.S. Pat. No. 6,499,606, USP 2003/0070981 A1).

The above methods have been developed primarily for membrane modules that contain multiple elements within a single housing, with the elements principally being of small-diameter, multi-channel construction. A different membrane module structure has been developed by Goldsmith, et al., disclosed in U.S. Pat. Nos. 4,781,831, 5,009,781, 5,108,601, and 6,126,833, all incorporated herein by reference. In these patents, large-diameter, multi-channel membrane elements are disclosed. The distinguishing characteristic of these elements is that they contain one or more internal permeate conduits for extracting permeate from the interior of the elements, circumventing a permeate-side pressure drop within multi-channel monolith membrane devices that would otherwise limit performance of such devices.

A preferred embodiment of the Goldsmith devices includes permeate extraction channels formed at one or both ends of a large diameter monolith, preferably in the form of slots intersecting permeate chambers extending longitudinally along the length of the membrane element. The presence of these channels, when present at both ends of the membrane element, affords a novel means of circulating permeate flow through the permeate conduit, co-currently with feed flow, to achieve a more uniform TMP along the length of the membrane element.

Another embodiment of the Goldsmith devices includes a means of permeate extraction from a monolith membrane element using permeate ducts situated at the end faces of the membrane element, the ducts communicating with the internal permeate conduit chambers through internal transverse channels. The presence of these ducts, when present at both ends of the membrane element, affords a second novel means of circulating permeate flow through the permeate conduit to achieve a uniform TMP along the length of the membrane element.

These constructions are amenable to co-current permeate circulation flow to maintain a constant or near-constant TMP along the length of such monolith membrane elements and form the basis for the present invention.

SUMMARY OF THE INVENTION

It is therefore an object of this invention to provide an improved crossflow membrane device that operates with a uniform transmembrane pressure along the length of the device.

It is a further object of this invention to provide such a device that has a large amount of membrane area per unit volume of the device.

It is a further object of this invention to provide such a device which uses a large-diameter, multiple-passageway monolith as a membrane support, the device utilizing a small fraction of the monolith passageways for a permeate conduit structure for extracting permeate from the interior of the device.

It is a further object of this invention to utilize the permeate conduit structure for circulation of permeate within the membrane device co-currently with feedstock flow so as to create a permeate pressure profile along the length of the device which results in a more uniform transmembrane pressure along the length of the device.

This invention results from the realization that for microfiltration and ultrafiltration membrane processes it is often advantageous to operate with a controlled and uniform transmembrane pressure along the length of the membrane device used in the process. Since the circulation of feedstock through the membrane device results in a sizeable pressure drop from the feed end of the device to the retentate end of the device, a controlled and uniform transmembrane pressure can be achieved if the permeate backpressure decreases in a like manner along the length of the membrane device.

This invention also results from the realization that large diameter monolith based membrane devices can be constructed with one or more internal permeate conduits to beneficially extract permeate from within the device, and more importantly, that such permeate conduit structures can be used to circulate permeate within the device co-currently with feedstock flow in a manner such that the permeate backpressure along the length of the device decreases in a manner that parallels the feedstock pressure drop within the device, thereby generating a uniform transmembrane pressure along the length of the device. The permeate conduits contain a plurality of longitudinal permeate chambers within the device, and circulating permeate flow co-currently down these chambers generates the desired permeate side pressure drop. There are various means of introducing permeate into the chambers and withdrawing permeate from the chambers at the feed inlet and retentate outlet ends of the device, respectively, and these can be implemented by simple modifications to the monolith structure and installing the membrane devices within housings with simple connections for permeate flow circulation.

This invention features a crossflow membrane device for receiving a feedstock at a feed end face and for separating the feedstock into permeate and retentate. The device uses a membrane support containing at least one monolith of porous material that defines a plurality of passageways extending longitudinally from the feed end face of the monolith to a retentate end face of the monolith through which the feedstock flows to pass retentate from the device. The device further contains a permselective membrane coating, of finer pore size than that of the porous material, applied to the passageway wall surfaces of the monolith. At least one permeate conduit for permeate extraction is contained within the monolith, the conduit containing a plurality of longitudinal permeate chambers communicating with a means of permeate introduction at or near the feed end face and permeate withdrawal at or near the retentate end face. A means of separating permeate from feed and retentate is provided and as is a means of circulating a portion of the permeate through the permeate conduit to create a decreasing permeate pressure within the permeate chambers from the feed end of the membrane device to the retentate end of the device.

The membrane support used in the device can be a single monolith or a plurality of monolith segments. The permselective membrane of the device preferably has a pore size in the range of 10 nanometers to 1 micron and is suitable for an ultrafiltration or microfiltration process.

In one embodiment, the means of permeate introduction to, and withdrawal from, the device can be channels which communicate with an annular space between the membrane device and a permeate collection housing. The annular space can be filled with a flow resistance material to reduce permeate flow through the annular space from the feed end of the device to the retentate end of the device. The flow resistance material can be a constrained bed of granular material and can be selected from the group of ceramic, glass, metallic or polymeric granular materials. Alternatively, the flow resistance material can be a metal or plastic mesh.

In yet another embodiment of the device, the means of permeate introduction and withdrawal is through ducts at the feed end face and the retentate end face, respectively.

For any of the above devices, the cross-sectional area of the permeate chambers can be reduced from the cross-sectional area of the chambers that would otherwise exist for a monolith support with a uniform and unmodified passageway structure. The chamber cross-sectional area can be reduced during the monolith support fabrication process. Alternatively, the chamber cross-sectional area can be reduced by plugging chambers of a monolith support during the device fabrication process. Or, the chamber cross-sectional area can be reduced by filling chambers of a monolith support with a constrained bed of granular material during the device fabrication process.

In a preferred embodiment the crossflow membrane device utilizes a porous ceramic monolith as a membrane support, the monolith defining a plurality of passageways extending longitudinally from the feed end face of the device to a retentate end face of the device through which the feedstock flows to pass retentate from the device. A permselective membrane coating with a mean pore size between 10 nanometers and 1 micron is applied to the passageway wall surfaces of the monolith. A permeate collection housing is provided as well as a means to separate permeate from feed and retentate at the feed end face and retentate end face, respectively. At least one permeate conduit is formed within the monolith, the conduit containing a plurality of longitudinal permeate chambers communicating with at least one transverse channel for permeate introduction near the feed end face and at least one transverse channel for permeate withdrawal near the retentate end face. Finally, a means is provided for circulating a portion of the permeate through the permeate conduit to create a decreasing permeate pressure within the permeate chambers from the feed end of the membrane device to the retentate end of the device.

This invention also features a method of separating a feedstock in a crossflow membrane device into permeate and retentate, which method includes introducing a feedstock into the feed end face of the device, contained within a permeate collection housing, and into a plurality of the device passageways for separation into a permeate and retentate. The permeate is collected in a permeate collection zone and removed from the device, and the retentate is removed from the retentate end face of the device. A portion of the permeate removed from the device is circulated through the internal permeate conduit co-currently with feedstock flow to provide a decreasing permeate pressure within the permeate chambers from the feed end of the membrane device to the retentate end of the device.

BRIEF DESCRIPTION OF THE DRAWINGS

FIGS. 3a and 3b show cross-sections of a portion of a monolith support; in particular extruded monolith passageway structures, to illustrate possible configurations of permeate conduit chambers in a permeate conduit. The cross-sections are located between the slots at the inlet and outlet ends of the device.

FIG. 4 shows a cross-section of a portion of a monolith support, in particular, the location of plugged monolith passageway patterns for permeate chambers in a permeate conduit. The cross-section is at the base of the slots at the inlet and outlet ends of the device, i.e., at the conduit chamber openings into the slots.

DETAILED DESCRIPTION OF THE INVENTION

Figure 1:
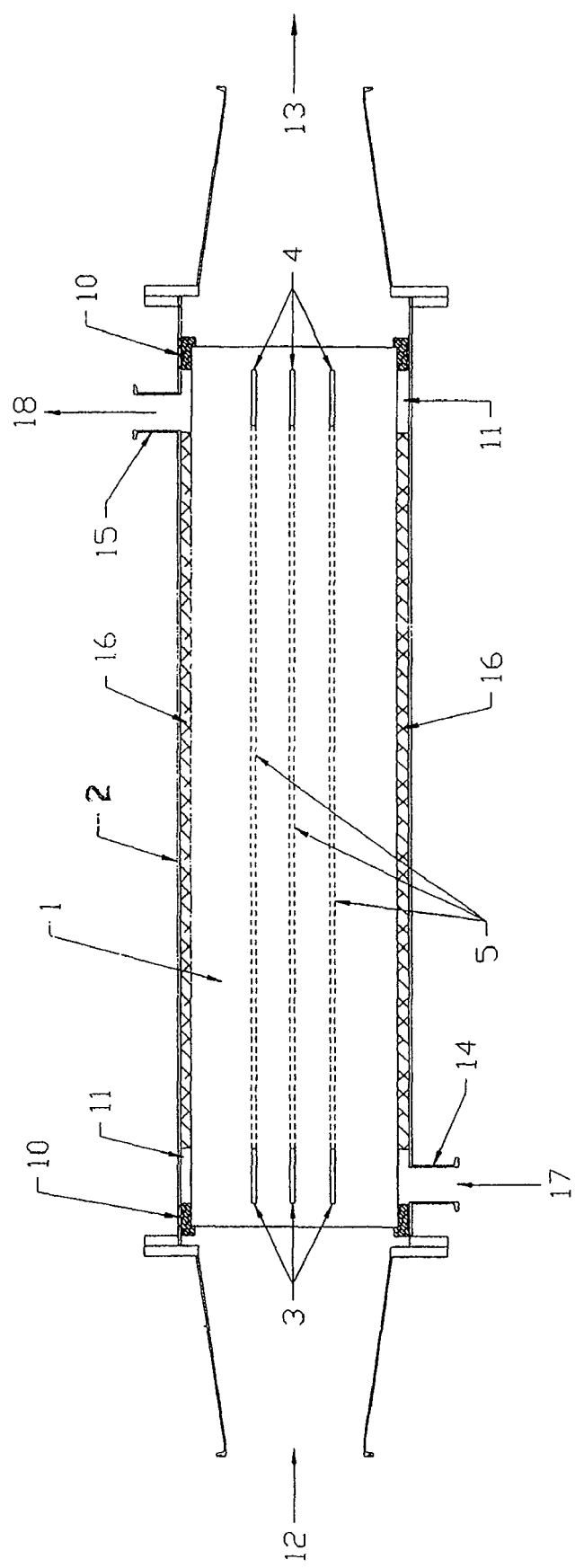
FIG. 1 shows a monolith membrane element 1 with one or more internal permeate conduits (three shown) contained in a housing 2. This construction is suitable for a membrane module (membrane element in permeate collection housing) for which permeate collection would normally be along the side of the membrane element. The permeate conduit structure includes slots 3 and 4 at the inlet and outlet ends of the element. The slots intersect and communicate with internal longitudinal permeate conduit chambers 5, which extend along the length of the element. These slots and chambers provide a means of implementing permeate flow circulation internal to the element.

In FIG. 1, a monolith membrane element 1 is contained with a module housing 2, with means 10 for isolating a permeate collection zone 11 from a feedstock inlet 12 and a retentate outlet 13. The membrane element contains one or more transverse slots 3 and 4 at the feed inlet and retentate outlet ends of the element, respectively, or other channels.

The slots transect a plurality of longitudinal permeate conduit chambers 5, and this constitutes one form of a permeate conduit, as described in the above-referenced Goldsmith patents. Permeate ports 14 and 15 are located on the module housing near the inlet and outlet ends, respectively. A flow resistance material 16 can be used to fill the permeate collection zone annulus situated between the membrane element and the module housing to increase the permeate flow resistance in this annular space.

In operation, depending on crossflow velocity, feed viscosity, membrane element channel diameter and channel length, an operating pressure profile is created. Typically, for microfiltration or ultrafiltration, this could be a feed inlet pressure of from <2 to 6 bar abs., a retentate outlet pressure of from <1 to 5 bar abs., and a permeate outlet pressure of about 1 bar abs. However, for the present invention, a pump external to the module (not shown) is used to provide permeate circulation into a permeate inlet port 17, through the permeate conduit (or conduits), for co-current flow in permeate chambers with feedstock flow, and out a permeate outlet port 18. This forced permeate circulation flow creates a non-uniform (decreasing) permeate pressure along the length of the element, making the TMP more uniform along the length of the element.

The resistance for flow through the annulus, with or without the flow resistance material, is preferably high compared to the flow resistance for permeate flow through the permeate conduit structure. The annular flow resistance should be at least as large as that through the permeate conduit structure.

A preferred structure of the permeate conduits for a unitary monolith membrane element contains a plurality of permeate chambers within the monolith which extend along the length of the monolith. The chambers preferably are in the form of one or more rows of monolith passageways. At both ends of the monolith, the permeate conduit chambers are transected by one or more transverse channels that communicate between the chambers and a permeate collection zone disposed along at least one side of the membrane element. The channels are preferably in the form of slots, sealed at the ends of the monolith element to prevent entry of feed or retentate material. A mechanical means is employed at the periphery of the monolith element ends to prevent mixing of feed or retentate with the permeate collected in the permeate collection zone.

For the multi-segment membrane module structures disclosed in U.S. Pat. No. 6,126,833, the permeate conduit structure consists of the above-described intra-segment structure within at least one monolith segment as well as an inter-segment permeate conduit structure defined by the space among the monolith segments.

The flow resistance material in the permeate annulus can take different forms. For example, the material can be a constrained bed of granular material, of a size such that the flow resistance through the bed of the granular material is relatively high. The granular material can be a powder comprised of a ceramic, glass, metallic, polymeric or other material. This would be similar to the above-referenced technique employed by Holm. An alternative is to use a mesh wrapped or slipped around the monolith peripheral surface, plastic or metal, to fill the permeate cavity. This would be similar to the materials used to wrap spiral wound membrane modules for operation in the so-called "sanitary bypass" mode. Products supplied commercially by GE Osmonics under the trade name Durasan® incorporate such meshes. The flow resistance material could also be comprised of open-cell or closed-cell foam, or a rubber mat, or any other material or means useful for creating a flow resistance within, or blockage of, the annular space. Considerations important for selection of the flow resistance material, other than its flow resistance properties, include ease of installation, chemical and thermal durability, and capability of being cleaned, especially for food, beverage and pharmaceutical applications, which require membrane modules that can be cleaned and sanitized or sterilized in place. It is preferable, although not necessary, that the flow resistance material create a uniform flow resistance along the length of the element. However, simply blocking the annular space, for example at both ends of the element, will force circulated permeate flow through the conduit structure.

An alternative is to control the annular dimension between the membrane element and the permeate collection housing such that during permeate circulation the flow through the annular space is relatively small compared to the flow through the permeate conduit structure within the membrane element. This method of permeate circulation to achieve a controlled TMP along the length of the membrane element would be analogous' to the technique employed by Osterland, et al.

Figure 2:
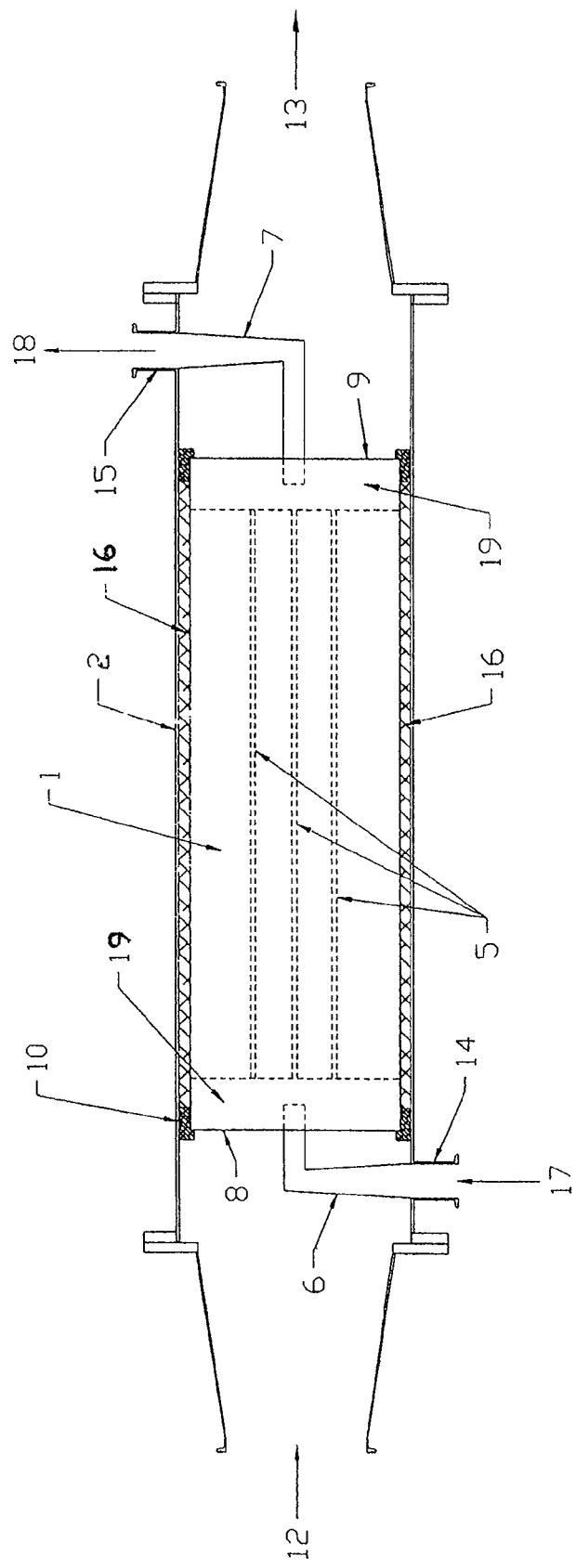
FIG. 2 shows an alternative monolith membrane element 1 with one or more internal permeate conduits (three shown) contained in a housing 2. In this instance, the permeate flow is through ducts 6 and 7 located at an inlet end face 8 and an outlet end face 9 of the membrane element. These ducts communicate with the internal longitudinal permeate conduit chambers and provide an alternative means of permeate circulation through the internal permeate conduit system.

FIG. 2 shows a different means of controlling TMP along the length of a membrane element. In this embodiment, permeate is circulated through the membrane element by introducing permeate flow into inlet permeate port 17, through duct 6 into the internal permeate conduit chambers 5, out duct 7, and discharged through outlet permeate port 18. The communication between the ducts and the permeate chambers 5 is through transverse channels 19, as disclosed in U.S. Pat. No. 5,009,781. The permeate that might collect in the cavity between the membrane element and the module housing must be isolated from the feed and retentate fluids. This can be accomplished by sealing the exterior surface of the membrane element, for example, with a ceramic glaze or an impermeable plastic wrap to prevent permeate collection in the annulus. Alternatively, this cavity can be isolated at the end faces using seals 10, such as elastomeric seals, as shown in FIG. 1. Pressure profiles are established within the membrane element for the feed introduced through port 12 and retentate exiting through port 13. Permeate backpressure along the length of the membrane element is established with the permeate conduit structure by circulating permeate flow, as for the module shown in FIG. 1. Independent control of the permeate circulation flow will permit control of TMP along the membrane element.

A further modification to the devices of this invention can include restriction of flow within the longitudinal permeate chambers. This may be desirable for two reasons. First is to minimize the fraction of resistance in the circulated permeate flow path that resides in the transverse permeate channels. It is desirable to have most of the pressure drop associated with permeate circulation through the permeate conduit occurring in the longitudinal chambers, and not in the transverse channels. Second, by reducing circulated permeate flow in the permeate conduit, the system hardware is reduced in size and cost, and the power consumption for permeate circulation is reduced. There are several means to increase the flow resistance of the permeate chambers, all associated with reduction, in one way or another, of the open cross-sectional area of the chambers. A first means can be achieved in the extrusion process (or other forming process) employed to make the monolith supports. Extrusion dies can be fabricated to reduce the passageway size 19 for the intended permeate chambers for a constant monolith wall pitch (FIG. 3a), by forming thicker passageway walls 20 adjacent to the chamber passageways. Alternatively monoliths can be extruded with some of the otherwise open permeate chambers as solid material 21 (FIG. 3b). These figures show a cross-section of the monolith support at a location removed from permeate channels at the ends, e.g. at or near the center of the device, and open permeate chambers are indicated by an "X".

A second means is to block, e.g., by plugging, some of the permeate chambers. This plugging can be performed at either end, or both ends, of some of the chambers, or along all or only a portion of the plugged chambers' lengths. An example of a plugging pattern that could be employed is shown in FIG. 4, which shows plugged chambers 22 darkened, with open chambers indicated by an "X". In yet another means of restricting flow in the permeate chambers, the chambers can be filled with a constrained bed of granular material, similarly to the use of granular material that could be used to fill the annular space, as disclosed above.

If excessive permeate circulation flow pressure drop exists in the permeate channels, then this resistance is to be reduced. Different means can be employed. For example, if a permeate channel is a slot overlying one row of permeate chambers, the depth of the slot can be increased. Alternatively, the slot can be made wider than one row of chambers, with the some of underlying chambers either plugged or reduced in size. Or, the number of permeate conduits, slot channels and passageway chambers, can be increased over what would be employed for a module without permeate circulation, with a means employed also for increasing the flow resistance of the permeate chambers.

For the above structures, permeate is circulated in co-current flow with feedstock. The resistance of the flow paths for the permeate flow, and associated pressure drop for permeate flow, are used to establish a more uniform TMP along the length of the membrane element. The necessary features of this invention are first, the use of a membrane element with at least one internal permeate conduit, and second a means of circulated permeate introduction into the conduit at the feed inlet end of the element and withdrawal at the retentate outlet end of the element. The circulated permeate flow creates a diminishing permeate pressure profile from the inlet end to the outlet end of the element within the element itself. Further, it is important that the pressure drop for the circulated permeate resided primarily in the permeate chambers so that the TMP is made as uniform as possible along the length of the device. In addition, in order to have an acceptable permeate chamber pressure drop profile along the device, the amount of permeate circulated should be at least as large as the permeate flow arising from membrane flux. This is to maintain a relatively uniform flow, and corresponding linear pressure level decrease, along the permeate chambers.

For all of the above devices, very compact membrane elements can be constructed. The membrane area per unit volume of the devices can be greater than about 100 square feet per cubic foot of membrane element volume.

The monolith membrane supports can be ceramic, metallic, polymeric, or other suitable porous material. The porosity of the monolith support is generally in the range of about 30 to 50%. The mean pore size of the monolith support is preferably in the range of about 3 microns to about 30 microns. The membrane elements, including both support and membrane coating applied to the passageway walls of the support, can utilize a single unitary monolith structure or a multi-segment monolith structure.

The membrane types for which this invention is applicable are microporous and are used for microfiltration and ultrafiltration. The pore sizes of such membranes are preferably in the range from about 10 nanometers to 1 micron. Membrane materials can be ceramic, metallic, polymeric, or combinations thereof.

Other embodiments will occur to those skilled in the art and are within the following claims.

What is claimed is:

1. A method of separating a feedstock into permeate and retentate with a membrane device that receives feedstock at a feed end face, comprising:
   a) providing a crossflow membrane element that receives the feedstock at a feed end face, and separates the feedstock into permeate and retentate, the membrane element comprising:
      i) a membrane support containing at least one monolith of porous material defining a plurality of passageways with passageway wall surfaces, the passageways extending longitudinally from the feed end face of the monolith to a retentate end face of the monolith;
      ii) a microfiltration or ultrafiltration membrane with a mean pore size in the range of 10 nanometers to 1 micron applied to the passageway wall surfaces of at least the channels through which the feedstock flows; and
      iii) at least one permeate conduit formed within the monolith, the conduit containing a plurality of longitudinal permeate chambers extending substantially the entire length of the monolith, transected proximate the feed end face by at least one permeate channel and proximate the retentate end face by at least one other permeate channel;
   b) providing a housing assembly that contains the membrane element, the assembly comprising:
      i) a housing that contains the element;
      ii) a feedstock inlet port in communication with the feed end face of the monolith, and a retentate outlet port in communication with the retentate end face of the monolith;
      iii) a permeate circulation inlet port in fluid communication with the permeate channel or channels proximate the feed end face, to allow for the introduction of circulated permeate into the permeate chambers and flow of at least some of the circulated permeate along the length of the permeate chambers;
      iv) a permeate outlet port in fluid communication with the permeate channel or channels proximate the retentate end face, to allow for the withdrawal of the permeate from the permeate chambers,
      v) one or more seals for separating the permeate flows from the feed and retentate flows;
   c) introducing a feedstock and withdrawing retentate; and
   d) circulating a portion of the permeate through the permeate conduit co-currently with the feedstock flow under independent permeate circulation flow control such that the permeate back pressure along the length of the permeate chambers decreases in a manner that substantially parallels the feedstock pressure drop within the feedstock flow channels, thereby generating a substantially uniform transmembrane pressure along the length of the membrane element.

2. The method of claim 1 in which the membrane support comprises a plurality of monolith segments.

3. The method of claim 1 in which the permeate is introduced and withdrawn by providing channels which communicate with an annular space between the membrane support and the housing.

4. The method of claim 1 in which the cross-sectional area of the permeate chambers is reduced from the cross-sectional area of the chambers that would otherwise exist for a monolith with a uniform and unmodified passageway structure.

5. The method of claim 4 in which the chamber cross-sectional area is reduced during the monolith fabrication process.

6. The method of claim 4 in which the chamber cross-sectional area is reduced by plugging chambers of the monolith.

7. The method of claim 2 in which the cross-sectional area of the permeate chambers is reduced from the cross-sectional area of the chambers that would otherwise exist for monolith segments with uniform and unmodified passageway structures.

8. The method of claim 7 in which the chamber cross-sectional area is reduced during the monolith segment fabrication process.

9. The method of claim 7 in which the chamber cross-sectional area is reduced by plugging chambers of the monolith segments.

10. The method of claim 3 in which the cross-sectional area of the permeate chambers is reduced from the cross-sectional area of the chambers that would otherwise exist for a monolith with a uniform and unmodified passageway structure.

11. The method of claim 10 in which the chamber cross-sectional area is reduced during the monolith fabrication process.

12. The method of claim 10 in which the chamber cross-sectional area is reduced by plugging chambers of the monolith.

13. The method of claim 1 in which the amount of permeate circulated is at least as large as the permeate flow arising from membrane flux.

14. The method of claim 1 in which the membrane support is a single monolith.

15. The method of claim 1 in which the permeate channels comprise slots at the end faces of the monolith that are sealed to isolate the permeate chambers from feed and retentate.

16. The method of claim 1 wherein the membrane element is spaced from the housing such that an annular space is defined between the membrane element and the housing, wherein at least one permeate channel proximate the feed end face and at least one permeate channel proximate the retentate end face communicate with the annular space between the membrane element and the housing.

17. The method of claim 1 in which the permeate inlet port comprises a first duct at the feed end face of the monolith, and the permeate outlet port comprises a second duct at the retentate end face of the monolith.

18. A method of separating a feedstock into permeate and retentate with a membrane device comprising a monolith of porous material contained within a housing, the method comprising:
   a) directing the feedstock into and through a plurality of feedstock passageways extending longitudinally through the monolith from a feed end face of the monolith to a retentate end face of the monolith;
   b) producing the permeate by directing at least a portion of the feedstock from one or more feedstock passageways, through a membrane applied to wall surfaces of the feedstock passageways and into at least one permeate conduit extending longitudinally through the monolith and including a plurality of permeate chambers extending in parallel relationship substantially the entire length of the monolith;
   c) wherein the permeate chambers extend between and are communicatively connected to a permeate inlet located proximate the feed end face of the monolith and a permeate outlet located proximate the retentate end face of the monolith;

d) directing permeate from the permeate chambers in the monolith to a permeate collection zone disposed outwardly of the monolith and generally between the housing and the monolith;

e) co-currently with the flow of feedstock through the feedstock passageways, recirculating at least a portion of the permeate from the permeate collection zone through the permeate chambers in the monolith such that the permeate being recirculated flows through the monolith adjacent the feedstock flowing in the feedstock passageways, and wherein substantially all of the permeate entering the permeate chambers via the permeate inlet flows through the permeate chambers to the permeate outlet; and f) as the permeate circulates through the permeate chambers in the monolith, independently controlling permeate back pressure in the permeate chambers such that the permeate back pressure along the length of the permeate chambers decreases in a manner that substantially parallels the feedstock pressure drop within the feedstock passageways, thereby generating a substantially uniform transmembrane pressure along the length of the monolith.

19. The method of claim 18 wherein one or more of the permeate chambers are plugged and the permeate being recirculated through the monolith bypasses the one or more plugged permeate chambers.

20. The method of claim 18 including controlling the flow of permeate being recirculated such that the flow of the recirculated permeate equals or exceeds permeate flow resulting from membrane flux.

21. The method of claim 18 wherein the monolith comprises a porous ceramic monolith and wherein the permeate conduit and the feedstock passageways extend through the porous ceramic monolith in side-by-side relationship.

22. The method of claim 18 further comprising controlling the pressure within the permeate chambers by pumping permeate from the permeate collection zone to the permeate chambers.

23. The method of claim 18 further comprising reducing permeate flow through the permeate collection zone by placing flow resistant material in the permeate collection zone and directing at least a portion of the permeate from the permeate chambers through the flow resistant material in the permeate collection zone.

24. The method of claim 18 further comprising maintaining a generally constant transmembrane pressure along the length of the monolith by linearly decreasing the pressure of the permeate along the length of the permeate chambers.

25. The method of claim 18 including decreasing permeate pressure within the permeate chambers from the feed end face of the monolith to the retentate end face of the monolith.

26. The method of claim 18 wherein directing permeate to the permeate collection zone includes directing permeate from the permeate chamber into and through a series of transverse channels formed in the monolith proximate the retentate end face.

27. The method of claim 26 including directing permeate to and from the permeate collection zone via a plurality of transverse channels formed in the monolith and communicatively connected between the permeate chambers and the permeate collection zone; and maintaining a greater pressure drop in the longitudinal permeate chambers than in the transverse channels.

28. The method of claim 27 wherein the flow restriction in the permeate chambers is greater than the flow restriction in the transverse channels.

29. The method of claim 28 wherein the greater flow restriction in the permeate chambers is achieved by selectively forming the permeate chambers or by plugging one or more of the permeate chambers.

30. The method of claim 27 wherein the pressure drop for the circulated permeate resides primarily in the permeate chambers.

31. The method of claim 30 wherein the amount of permeate circulated is at least as large as the amount of permeate arising from membrane flux.

32. The method of claim 1 including directing substantially all of the permeate entering the permeate chambers via the circulation inlet port down the permeate chambers and out the permeate outlet port such that substantially all of the circulating permeate entering the permeate chambers exit the permeate chambers via the permeate outlet port located approximate the retentate end face of the membrane element.

* * * * *